April 5, 1955 C. D. KEELY Re. 23,975
MECHANICAL TOOTHBRUSH WITH OPPOSED OSCILLATORY BRUSHES
Original Filed Jan. 27, 1953
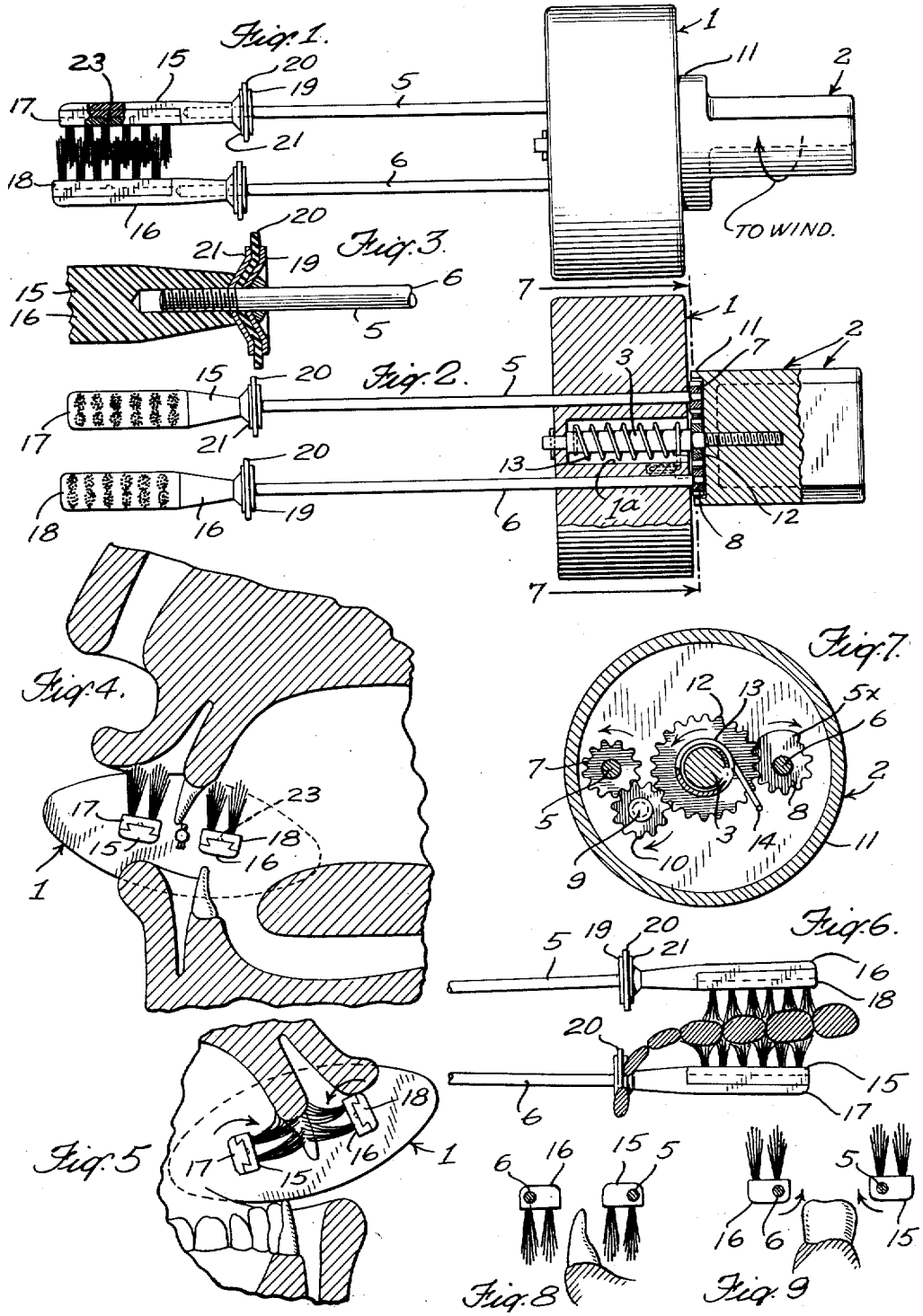

United States Patent Office

Re. 23,975

Reissued Apr. 5, 1955

23,975

MECHANICAL TOOTH BRUSH WITH OPPOSED OSCILLATORY BRUSHES

Clifford D. Keely, West Englewood, N. J.

Original No. 2,682,066, dated June 29, 1954, Serial No. 333,511, January 27, 1953. Application for reissue January 17, 1955, Serial No. 482,441

10 Claims. (Cl. 15—22)

Matter enclosed in heavy brackets [ ] appears in the original patent but forms no part of this reissue specification; matter printed in italics indicates the additions made by reissue.

My present invention relates to a mechanical toothbrush having a pair of opposed oscillatory brushes. It is generally recognized that the best brushing stroke from the standpoint of both the teeth and the gums is one which commences at the gum line or remote therefrom in the direction away from the teeth and proceeds in a direction along the sides of the teeth and the lines of separation between them to the end of the side walls thereof.

It is therefore a principal object to devise a mechanical toothbrush for preferably manual operation by which such a brushing motion can be achieved to the exclusion of other and habitual brushing actions which are unfavorable to the teeth and gums, and/or ineffective.

More specifically it is an object to provide such a toothbrush, consisting of two oppositely disposed brushes preferably of conventional shape and size which in a position of rest will permit the two brushes to straddle the teeth—either upper or lower—and which upon the commencement of the same brushing stroke will simultaneously engage opposite sides of the teeth. Then upon the completion of such stroke within less than 360 degrees of arc, the brushes will be returned preferably by spring action to the starting position as the user moves the device slightly away from the teeth, these motions being repeated until the cleaning action is completed.

Other objects of the invention and the advantages thereof will be apparent as the description proceeds and the features of novelty will be pointed out in the appended claims.

For a complete understanding, reference may now be had to the following detailed description taken with the annexed drawings, in which Fig. 1 is a side view of the toothbrush showing the bristles in interleaved position to facilitate rotation of the bristles of the brushes past one another on the return stroke;

Fig. 2 is a similar view with parts in section to show the interior construction of the handle block and with the bristles disposed away from the viewer;

Fig. 3 is a cross-section showing the details of construction of the drip shield;

Fig. 4 is a view of the brushes disposed about the upper teeth to be brushed and indicating the downward cleaning stroke;

Fig. 5 is a view of the brushes after having been rotated through approximately half of their full stroke and approximately 90 degrees from the position shown in Fig. 4;

Fig. 6 is a view of the brushes disposed about the teeth showing the manner in which the brushes simultaneously clean the crevices between the teeth as well as the lateral tooth surfaces;

Fig. 7 is a rear view of the toothbrush with its finger block removed, taken on line 7—7 of Fig. 2 and showing the construction used to effect an oscillatory action simultaneously by both brushes; and Figs. 8 and 9 show the action of the brushes proper when mounted offset inwardly in respect to their respective shafts.

Referring to the drawings in detail, 1 denotes a handle block having a centrally disposed aperture $1^a$ terminating in a restricted bore as shown and two smaller bores spaced from the larger bore already mentioned, said bores all being parallel to one another and traversing the distance between the flat ends of the handle block. Positioned adjacent the outer flat end of the handle block 1 is a finger block 2.

A pair of elongated brush holder rods or shafts 5 and 6 are disposed in the smaller bores of the handle block 1. The end of rod 5 which is positioned adjacent handle block 1 has a gear 7 fixed thereto. Similarly, the corresponding end of rod 6 has a gear 8 fixed thereto. The gears 7 and 8 are disposed flatly against the rear flat surface of block 1. A stud axle 9 is fixed in the rear flat surface of block 1 and an idler gear 10 is placed thereon. Preferably shafts 5 and 6 have a degree of flexibility allowing them to separate slightly when the sides of the wider molar teeth are engaged.

The finger block 2 may have a round contour but preferably is provided with two parallel spaced apart flat surfaces as shown to facilitate being grasped and turned by the fingers of one hand. The front end of the finger block 2 may also be provided with a circular collar 11 which axially protrudes beyond the inwardly disposed front flat surface thereof, thereby providing a circular cavity at the end of said block 2 for reception of the driving means for the brushes as will be hereinafter apparent. The shaft 3 may be fixed in said block 2 by being screwed therein or by other conventional means. A primary gear 12 is fixed to said shaft 3 adjacent the front surface of block 2 by welding or other conventional means.

A coil spring 13 is disposed about the rod 3 with its forward end fixed, for example by soldering thereto. The rear end of spring 13 is provided with a straight uncoiled portion 14 parallel to rod 3 and is held fixed in a small bore in block 1. Aperture $1^a$ of the latter receives said rod 3 and the coiled spring 13 thereon.

As shown in Fig. 7, gear 7 is provided with a non-toothed section $5^x$ which limits the amount of rotation that gear 7 may undergo relative to primary gear 13.

The front ends of shafts 5 and 6 are screw-threaded as shown best in Fig. 3. A pair of brush holders 15 and 16 are bored and tapped to receive said screw-threaded ends of rods 5 and 6 respectively. The brushes 17 and 18, preferably of conventional shape and size, are replaceable for which purpose they preferably are provided with dovetail backs adapted to be keyed into dovetail grooves in said brush holders, as shown best in Figs. 1, 4 and 5.

Preferably a drip shield is disposed about each of said brush holder shafts 5 and 6 at a point adjacent to the brush holders. This drip shield consists of a first washer 19 disposed inwardly on said rods and fixed by soldering or by other conventional means. A drip shield proper 20, preferably made of rubber, is then disposed against washer 19. The shield 20 is of larger diameter than washer 19 and is adapted to prevent tooth-paste or liquid from running down the brush holder rods as well as to provide a yielding stop against the teeth. A second washer 21, which is removable, is then disposed on the shafts 5 and 6, and lastly the brush holders are screwed into place. The threads on one of the brush holder rods is preferably of the right-handed type whereas the threads of the other brush holder rod are preferably left-handed to guard against brush holders 15, 16 becoming loose.

The brush 17 is preferably so disposed relative to brush 18 that its bristles pass between the bristles of brush 18 (Fig. 1), thereby permitting rotation of the brushes past each other without substantial interference and facilitating their return by the spring action provided for.

When the finger piece 2 is turned, it will cause rotation of the shaft 5 through gears 12, 10 and 7 and will also cause rotation of shaft 6 through gears 12, and 8. However, rotation of the shafts and brushes carried thereby past the point at which the cleaning stroke is needed is prevented by the action of the non-toothed segment $5^x$ of gear 8. During the cleaning stroke which normally does not occupy substantially more than 180° of arc, spring 13 is energized so that when the finger piece 2 is released the brushes are brought back to their initial position of rest [already described,] *illustrated in Figures 2 and 4 in which further return movement of the parts is prevented by non-toothed segments $5^x$ as seen in Figure 7,* such return stroke being facilitated by the fact that the bristles of the respective brushes interleave with one another.

Because of the presence of the non-toothed segment 5x, the finger block 2 cannot be rotated throughout an arc of 360 degrees, but rather only through a definite angle sufficient to accomplish a cleaning stroke. Furthermore, turning of the finger block 2 during such stroke causes the coil 13 to be wound up since the free end of the coil, namely spring portion 14, is secured in its aperture in handle block 1, and the release of the finger block 2 allows the parts to return to their normal position because of the unwinding action of the wound-up coil 13.

In operation the improved device is grasped with one hand, e. g., the left hand for a right-handed person, engaging the handle block 1 and is placed in the mouth so as to bring the opposed brushes on opposite sides of the teeth to be brushed at a position as seen, for example, in Fig. 4 wherein the bristles extend up to or slightly above the gum line. Then the power cleaning stroke is commenced by turning the finger block 2 clockwise with the other hand, the turning movement being had until the angular turning limit of movement of the brushes is reached, it being noted that as the opposed brushes move toward one another a thorough and approved cleaning action and gum massage are had. Figs. 5 and 6 show the action of the brushes in midstroke. Having completed the cleaning stroke, the device is then moved away a slight distance from the teeth and the finger block 2 released to permit the brushes to return to their initial position by the unwinding action of spring 13. The device is then placed in the same or adjoining position to accomplish a further cleaning stroke and this action repeated until the side surfaces of all the teeth including those between adjacent teeth have been cleaned. Having thus cleaned the sides of the teeth, the grinding surfaces of the bicuspid and molar teeth may if desired be cleaned by exercising a brushing action with the device as a whole.

Figs. 4, 5 and 6 show the brushes applied to the upper teeth. For brushing the lower teeth, it will be understood that the brushes will be turned downwardly instead of upwardly for commencing the cleaning stroke. In this instance, the action will be the same with the same clockwise rotation of the finger block 2.

Due to the action of the shields 20, the likelihood of diluted dentrifice running down the shafts into the motor mechanism is obviated. Instead of manual action, the turning of the brushes may, if desired, be accomplished by a spring or electric motor, the action of which may be controlled by the user through suitable start and stop mechanism.

Reference to the central driving gear 12, Fig. 7, will disclose the fact that it has about double the amount of teeth of gears 7 and 8. Hence a quarter turn only of the block 2 is necessary to cause the required approximate 180° rotation of the brushes.

Figs. 8 and 9 show the effect of having the shafts 5 and 6 offset outwardly with respect to the center lines of brush holders 15, 16 in lieu of having such shafts coincide with such center lines as in the previously described embodiment. Thereby, when the brushes occupy the positions assumed at the end of their stroke, the distance between the inner surfaces of the brush holders will be greater by the total amount of the offset and will minimize the likelihood of the brush holders striking the wider teeth.

Although the spring 13 has the advantage of mechanically returning the brushes to their proper initial or starting positions, it is possible to omit the spring and accomplish the return of the brushes manually to their starting positions. Also the brushes proper 17 and 18 instead of being removable with respect to the backs or holders 15, 16 may if desired be integral with such holders. Where the brushes proper 17, 18 are so removable, such action may be facilitated by providing the backs of the brush holders proper with a small boss or other protuberance 23 by means of which to engage the brushes proper.

Other changes will be obvious to those skilled in the art without departing from the spirit of the invention or the scope of the appended claims.

I claim:

1. In a mechanical toothbrush, a pair of substantially parallel shafts each terminating in a toothbrush proper, said brushes being disposed substantially opposite one another and each having a back and bristles projecting for a substantial distance from one side only of said back, said brushes proper occupying a starting or rest position in which they are separated to permit them to straddle the teeth and in which upon the start of the brushing stroke such bristles engage opposite sides of the teeth simultaneously, means for simultaneously turning said shafts to move said brushes rotatably toward one another and thereafter away from one another, and stop means preventing further turning of the shafts upon completion of the brushing stroke of substantially less than 360 degrees of arc.

[2. The toothbrush according to claim 1 having spring means for returning said brushes to their rest position.]

[3. The toothbrush according to claim 1 in which said shafts have thereon drip preventing elements.]

[4. The toothbrush according to claim 1 in which at the rest position said brushes have their bristles extending in directions slightly divergent from the parallel.]

[5. The toothbrush according to claim 1 in which the tufts of the bristles of the respective brushes are disposed so as to interleave with one another.]

[6. The toothbrush according to claim 1 in which the brush proper consists of a portion secured to the shaft and a bristle-containing portion removably secured to said portion first mentioned.]

[7. A toothbrush according to claim 1 in which the brushes proper are secured to their respective shafts in a manner such that said brushes are offset inwardly of the central longitudinal median axes thereof.]

[8. A toothbrush according to claim 1 in which said shafts are resilient to permit both accommodation of the incisor and molar teeth.]

*9. In a mechanical toothbrush, a pair of substantially parallel shafts each terminating in a toothbrush proper, said brushes being spaced from one another in opposed relationship and each having a back and bristles projecting for a substantial distance from one side only of said back, said brushes proper occupying a starting or rest position in which they are separated to permit them to straddle the teeth and in which upon the start of the brushing stroke such bristles engage opposite sides of the teeth simultaneously, means for simultaneously turning said shafts to move said brushes rotatably toward one another to accomplish the brushing stroke, and stop means limiting further turning of the shafts after completion of the brushing stroke of substantially less than 360° of arc, said stop means also serving to establish the starting position of the brushes upon their return stroke.*

*10. In a mechanical toothbrush, a pair of substantially parallel shafts each terminating in a toothbrush proper, said brushes being spaced from one another in opposed relationship and each having a back and bristles projecting for a substantial distance from one side only of said back, said brushes proper occupying a starting or rest position in which they are separated to permit them to straddle the teeth and in which upon the start of the brushing stroke such bristles engage opposite sides of the teeth simultaneously, means for simultaneously turning said shafts to move said brushes rotatably toward one another to accomplish the brushing stroke, and means establishing the starting position of the brushes upon their return stroke.*

*11. The toothbrush according to claim 10 having spring means for returning said brushes to their rest position.*

*12. The toothbrush according to claim 10 in which said shafts have thereon drip preventing elements.*

*13. The toothbrush according to claim 10 in which at the rest position said brushes have their bristles extending in directions slightly divergent from the parallel.*

*14. The toothbrush according to claim 10 in which the tufts of the bristles of the respective brushes are disposed so as to interleave with one another.*

*15. The toothbrush according to claim 10 in which the brush proper consists of a portion secured to the shaft and a bristle-containing portion removably secured to said portion first mentioned.*

*16. A toothbrush according to claim 10 in which the brushes proper are secured to their respective shafts in a manner such that said brushes are offset inwardly of the central longitudinal median axes thereof.*

*17. A toothbrush according to claim 10 in which said*

*shafts are resilient to permit both accommodation of the incisor and molar teeth.*

References Cited in the file of this patent or the original patent

UNITED STATES PATENTS

| | | |
|---|---|---|
| 1,201,548 | Brooks | Oct. 17, 1916 |
| 1,326,900 | Albers | Jan. 6, 1920 |
| 1,869,991 | White et al. | Aug. 2, 1932 |
| 2,290,454 | Steinberg | July 21, 1942 |

FOREIGN PATENTS

| | | |
|---|---|---|
| 614,369 | France | of 1926 |